United States Patent
Giuliano et al.

(10) Patent No.: US 12,275,089 B2
(45) Date of Patent: Apr. 15, 2025

(54) ADDITIVELY MANUFACTURED HEAT EXCHANGER WITH SPECIAL SURFACE ROUGHNESS

(71) Applicant: Hamilton Sundstrand Corporation, Charlotte, NC (US)

(72) Inventors: John Giuliano, North Granby, CT (US); Viktor Kilchyk, Lancaster, NY (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 460 days.

(21) Appl. No.: 17/749,430

(22) Filed: May 20, 2022

(65) Prior Publication Data
US 2023/0373031 A1 Nov. 23, 2023

(51) Int. Cl.
| | |
|---|---|
| B23K 26/342 | (2014.01) |
| B23K 26/352 | (2014.01) |
| B33Y 80/00 | (2015.01) |
| F28F 1/00 | (2006.01) |
| F28F 13/18 | (2006.01) |

(52) U.S. Cl.
CPC ........ *B23K 26/342* (2015.10); *B23K 26/3584* (2018.08); *B33Y 80/00* (2014.12); *F28F 1/006* (2013.01); *F28F 13/18* (2013.01)

(58) Field of Classification Search
None
See application file for complete search history.

(56) References Cited

U.S. PATENT DOCUMENTS

| | | | |
|---|---|---|---|
| 1,958,364 A * | 5/1934 | Govers | F28F 1/26 165/181 |
| 3,885,936 A * | 5/1975 | Limebeer | F28F 21/067 165/172 |
| 3,969,448 A * | 7/1976 | Limebeer | F28F 13/06 62/305 |
| 6,302,197 B1 * | 10/2001 | Hornby | F28F 1/02 165/173 |
| 8,541,721 B2 * | 9/2013 | Moskal | B21D 31/02 219/539 |
| 9,101,890 B2 | 8/2015 | Tonkovich et al. | |

(Continued)

FOREIGN PATENT DOCUMENTS

| | | | | |
|---|---|---|---|---|
| CN | 111112616 A * | 5/2020 | | B22F 10/00 |
| CN | 112985115 A | 6/2021 | | |

(Continued)

OTHER PUBLICATIONS

Translation of CN-111112616-A (Year: 2020).*
Extended European Search Report for EP Application No. 23174383.2, dated Sep. 28, 2023, 8 pages.

*Primary Examiner* — Jacob J Cigna
(74) *Attorney, Agent, or Firm* — Kinney & Lange, P.A.

(57) ABSTRACT

A heat exchanger core comprises a plurality of tubes extending along a first fluid axis, each of the plurality of tubes comprising a leading edge, a trailing edge opposite the leading edge, and a pair of oppositely disposed sidewalls extending from the leading edge to the trailing edge. The leading edge, trailing edge, and the pair of sidewalls define an inner surface and an outer surface of each of the plurality of tubes. Each of a first subset of the plurality of tubes further comprises a roughened region on the outer surface of one of the pair of sidewalls.

19 Claims, 4 Drawing Sheets

(56) References Cited

U.S. PATENT DOCUMENTS

| | | | | |
|---|---|---|---|---|
| 9,976,815 | B1* | 5/2018 | Roper | F28D 7/08 |
| 11,167,375 | B2* | 11/2021 | Schiffres | B22F 10/28 |
| 11,802,734 | B2* | 10/2023 | Vaidyanathan | F28D 7/1653 |
| 11,988,461 | B2* | 5/2024 | MacDonald | F28D 1/05383 |
| 12,066,197 | B2* | 8/2024 | Narayanan | F25B 30/02 |
| 2010/0263847 | A1* | 10/2010 | Alahyari | F28D 1/05333 |
| | | | | 165/173 |
| 2019/0033013 | A1* | 1/2019 | Byfield | B22F 10/20 |
| 2021/0180888 | A1* | 6/2021 | Schoneboom | F28F 21/065 |
| 2021/0270534 | A1* | 9/2021 | Erno | F28D 7/005 |

FOREIGN PATENT DOCUMENTS

| | | | |
|---|---|---|---|
| EP | 4220061 | A1 | 8/2023 |
| JP | 5630977 | B2 | 10/2014 |

\* cited by examiner

ADDITIVELY MANUFACTURED HEAT EXCHANGER WITH SPECIAL SURFACE ROUGHNESS

BACKGROUND

The present disclosure is related generally to heat exchangers and more particularly to heat exchanger core designs with selective surface roughness.

Aviation heat exchanger designs must balance competing objectives with respect to weight, size, and performance requirements. Additively manufactured heat exchangers offer a degree of geometry customization to achieve maximum optimization.

SUMMARY

A heat exchanger core comprises a plurality of tubes extending along a first fluid axis, each of the plurality of tubes comprising a leading edge, a trailing edge opposite the leading edge, and a pair of oppositely disposed sidewalls extending from the leading edge to the trailing edge. The leading edge, trailing edge, and the pair of sidewalls define an inner surface and an outer surface of each of the plurality of tubes. Each of a first subset of the plurality of tubes further comprises a roughened region on the outer surface of one of the pair of sidewalls.

A method of forming a heat exchanger core comprises forming, in a layer-by-layer fashion, a plurality of core tubes along three orthogonal axes, the three orthogonal axes comprising a first axis, a second axis, and a third axis, engaging a first setting to form a relatively smooth region on a surface of one tube of the plurality of tubes, the first setting comprising a first laser scanning speed and a first laser power, and engaging a second setting to form a roughened region on the surface of the one tube of the plurality of tubes, the second setting comprising a second laser scanning speed and a second laser power. The first laser scanning speed is different from the second laser scanning speed, and the first laser power is different from the second laser power.

Figure 1:
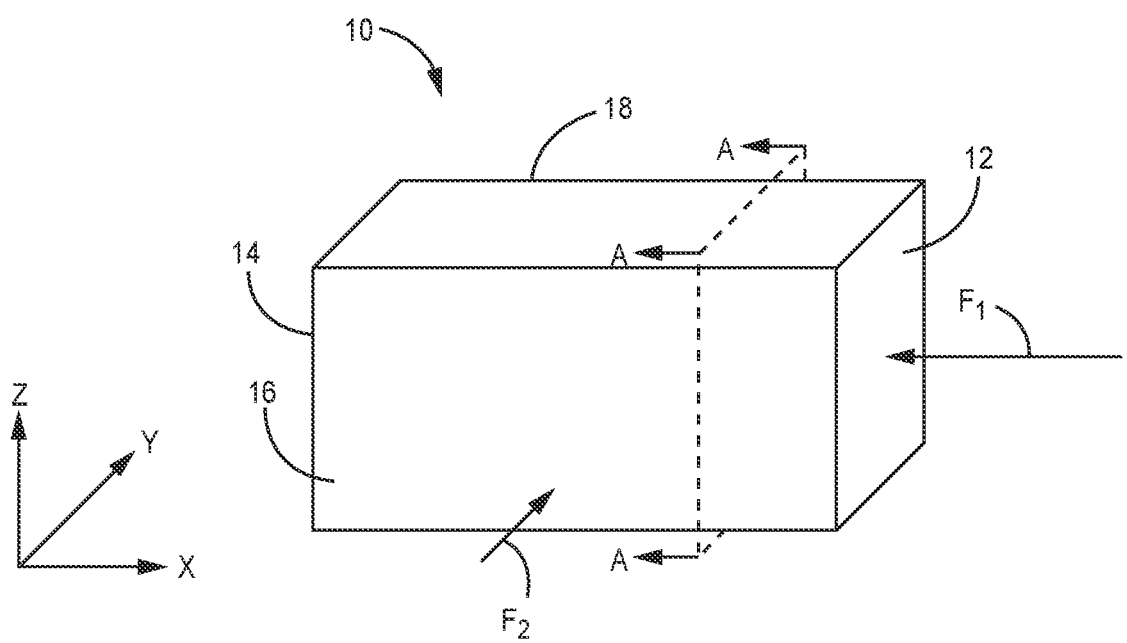
FIG. 1 is a simplified perspective view of a heat exchanger core of a counter flow heat exchanger.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents heat exchanger core arrangements using various tube geometries and selective surface roughness. Individual core tubes can be aerodynamically shaped to improve fluid flow external to the core tubes. External surface roughness can be selectively introduced to induce some turbulence and increase heat transfer. Internally, one or a combination of surface roughness and varied cross-sectional area can be introduced to balance heat transfer and pressure drop of the internal fluid flow. Additive manufacturing allows for such designs.

FIG. 1 is a simplified perspective view of heat exchanger core 10. Core 10 includes first fluid inlet side 12, first fluid outlet side 14, second fluid inlet side 16, and second fluid outlet side 18. In operation, first fluid $F_1$ flows from an inlet header (not shown) and into first core 10 at first fluid inlet side 12. First fluid $F_1$ travels along the x-axis through core 10 and exits through first fluid outlet side 14. First fluid outlet side 14 can be in fluid communication with an outlet header (not shown). Second fluid $F_2$ enters core 10 at second fluid inlet side 16 and travels along the y-axis, exiting core 10 at second fluid outlet side 18. Second fluid inlet side 16 and second fluid outlet side 18 are offset roughly 90° from first fluid inlet side 12 and first fluid outlet side 14. As such, core 10 is configured in a cross-flow arrangement in FIG. 1, with the two fluid flows $F_1$ and $F_2$ generally orthogonal to one another. In an alternative embodiment, second fluid $F_2$ can flow along the x-axis in an opposite flow direction (i.e., a counter flow arrangement), or in the same flow direction (i.e., a parallel flow arrangement). First fluid $F_1$ can be a relatively cool fluid having a lower temperature than second fluid $F_2$, which can be a relatively hot fluid, but the designations can be reversed in alternative embodiments.

Figure 2:
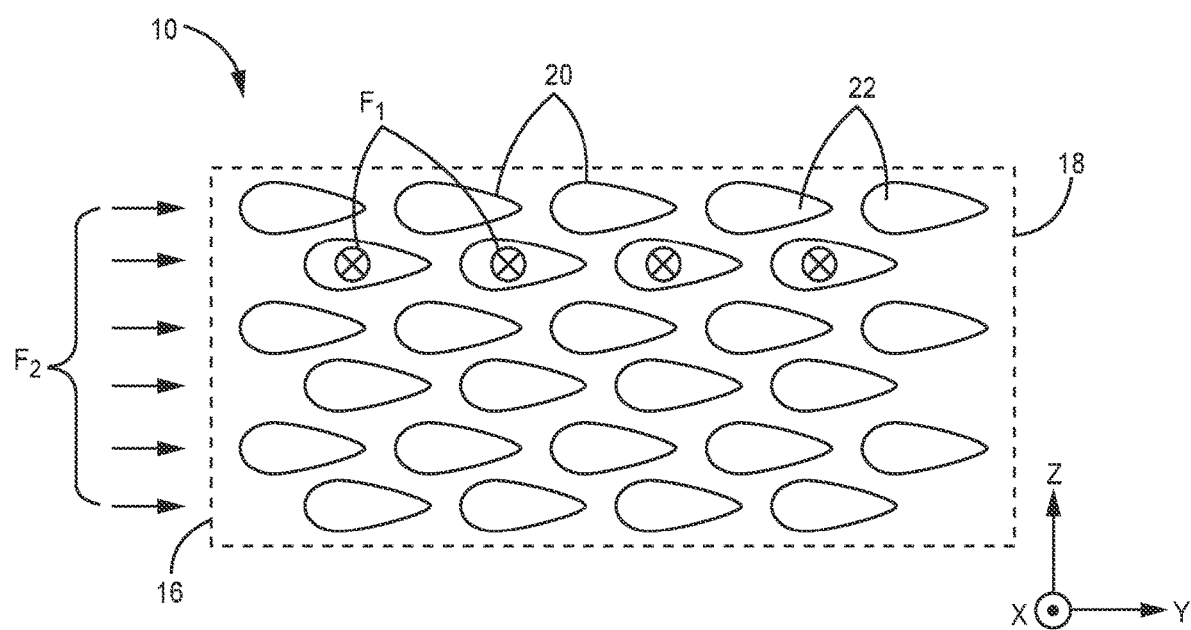
FIG. 2 is a cross-sectional view of the heat exchanger core taken at plane A-A of FIG. 1.
Figure 3:
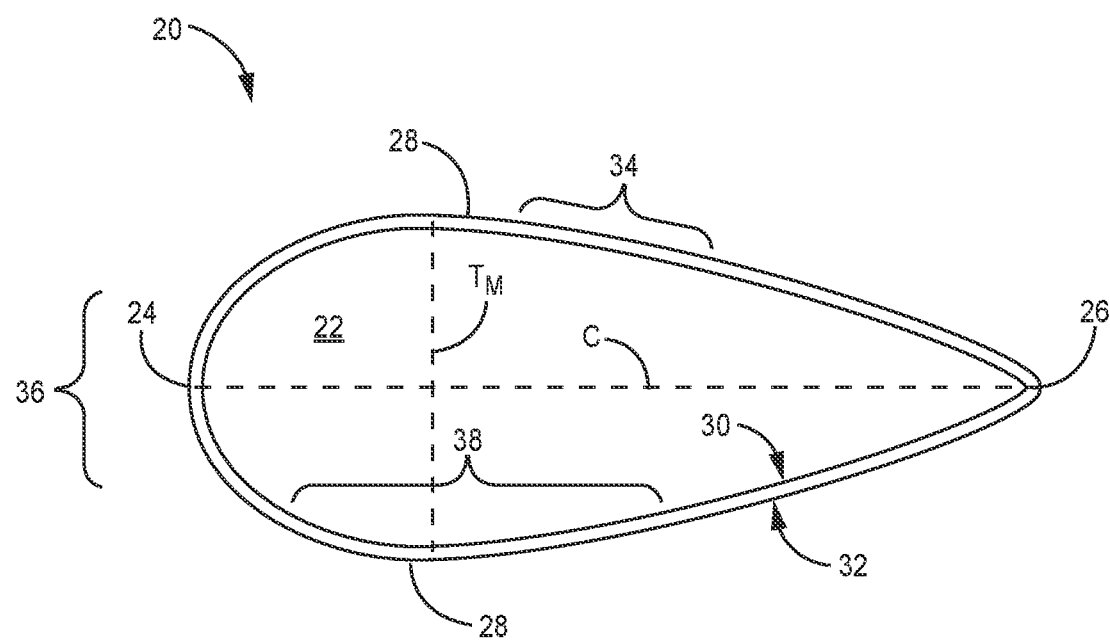
FIG. 3 is a cross-sectional view of an individual tube of the heat exchanger core.
Figure 4:
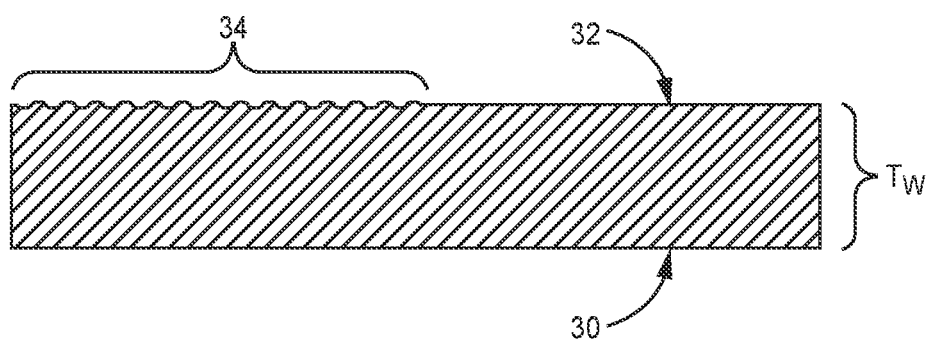
FIG. 4 is a simplified cross-sectional view of a straightened wall segment of the individual tube showing a roughed region.

FIG. 2 is a simplified cross-sectional view of core 10 taken at plane A-A of FIG. 1 showing core tubes 20. FIG. 3. is an enlarged cross-sectional view of a single core tube 20. FIG. 4 is a simplified cross-sectional view of a relatively straight segment of one sidewall 28 of core tube 20 having surface roughness. FIGS. 2-4 are discussed together.

As shown in FIG. 2, core 10 includes multiple core tubes 20 arranged in rows and columns filling the area defined by the y-z plane of core 10. Each core tube 20 extends longitudinally along the x-axis from first fluid inlet 12 to first fluid outlet 14, and each is configured to receive and pass along a portion of first fluid $F_1$ through its inner space, or core tube cavity 22. First fluid $F_1$ is shown within inner cavities 22 of a single row of core tubes 20, but most or all of core tubes 20 would be expected to pass an amount of first fluid $F_1$ in operation of core 10. Second fluid $F_2$ passes from second fluid inlet 16 to second fluid outlet 18 along the outside of core tubes 20.

In the embodiment shown, core tubes 20 have an airfoil-shaped cross-sectional geometry (i.e., in the y-z plane) including leading edge 24 and an oppositely disposed trailing edge 26. A pair of oppositely disposed sidewalls 28 connects leading edge 24 to trailing edge 26. Sidewalls 28 include an inner surface 30, an outer surface 32, and a wall thickness Tw (labeled in FIG. 4) defined therebetween at a given location. The dimensions of an airfoil-shaped core tube 20 include chord C and max thickness TM. Chord C is the major dimension of core tube 20, extending along the y-axis from leading edge 24 to trailing edge 26. Max thickness TM is the thickest/widest point of core tube 20 along the z-axis. Regions 34, 36, and 38 represent some areas where surface roughness can be introduced, as is discussed in greater detail below.

With respect to second fluid $F_2$, the airfoil shape helps reduce flow resistance and turbulence of second fluid $F_2$ across core tubes 20. If outer surface 32 at leading edge 24 is smooth, fluid flow will split into two streams of smooth (i.e., laminar) flow. Assuming a smooth outer surface 32 for the entirety of a respective core tube 20, flow streams may become slightly unstable as they move aft of leading edge 24, however, laminar flow will form at each leading edge 24 as the flow of second fluid $F_2$ advances toward second fluid outlet side 18. While such flow characteristics may be desirable for preventing flow bypass of core 10 from a high degree of flow resistance, this can lead to suboptimal heat transfer between the core tube 20 inner cavities 22 and outer surfaces 32. Accordingly, surface roughness can be added to outer surface 32 to create a turbulent flow to increase heat transfer through the respective core tube 20. More specifically, one or more roughed regions 34 can be included on outer surface 32 of one, or preferably both, sidewalls 28 to increase turbulence in the otherwise laminar flow coming off leading edge 24. In an alternative embodiment, it can be desirable to alternatively and/or additionally include roughened region 36 on outer surface 32 at leading edge 24. Such roughness may be implemented in subsets of early (i.e., upstream) and/or late (i.e., downstream) core tubes 20 to increase flow turbulence of second fluid $F_2$ near inlet side 16 and/or outlet side 18. It should be understood that roughened regions 34 and/or 36, as described, need not be included on every core tube 20, rather, they may be strategically placed on a subset of core tubes 20 to induce desired flow and heat transfer characteristics. Further, roughened regions 34 and/or 36 can be disposed along a greater circumferential extent of outer surface 32 than what is indicated by the brackets in FIG. 3.

With respect to first fluid $F_1$, core tubes 20 can further be designed to optimize heat transfer and pressure drop (i.e., $\Delta P$) within a respective core tube 20 between first fluid inlet side 12 and first fluid outlet side 14. An amount of pressure drop in a given design is both accounted for and necessary for heat transfer, however roughened surfaces, if incorporated too liberally into a design, can exacerbate pressure drop beyond an acceptable level and lead to a non-uniform mass flow across all or a subset of core tubes 20. To optimize core tubes 20 for both heat transfer and pressure drop, one or more roughed regions 38 can be incorporated on inner surface 30 of a respective core tube 20. For example, the temperature difference between first fluid $F_1$ and second fluid $F_2$ will be greatest at first fluid inlet side 12, thus heat transfer will also tend to be greatest at this location. Accordingly, roughened regions 38 can be incorporated downstream of first fluid inlet side 12, for example, beginning at a midpoint between first fluid inlet side 12 and first fluid outlet side 14. For a respective core tube 20, roughened region 38 may be continuous (e.g., along the x-axis or circumferentially along inner surface 30) or can be discrete roughened regions 38. As with roughed regions 34 and 36, it should be understood that roughened regions 38, as described, need not be included within every core tube 20, rather, they may be strategically placed on a subset of core tubes 20 to induce desired flow and heat transfer characteristics. Further, roughened regions 38 may be incorporated in conjunction with or exclusive of the implementation of roughened regions 34 and/or 36.

With continued reference to first fluid $F_1$, it may be desirable to complement inner surface roughness (i.e., roughened regions 38) with varied core tube 20 cross-sectional shapes, diameters, and/or wall thicknesses. As an amount of first fluid $F_1$ travels along a respective core tube 20, the fluid temperature will increase as it travels away from first fluid inlet side 12 due to thermal transfer between first fluid $F_1$ and second fluid $F_2$. An increase in fluid temperature leads to an increase in fluid volume and pressure drop. Accordingly, increasing the cross-sectional area (i.e., in the y-z plane) of a respective core tube 20 can be used to control pressure drop. This can be accomplished, for example, by expanding internal cavity 22 along the z-axis. Specifically for an airfoil shaped core tube 20, this can mean increasing max thickness TM, or other dimension along the z-axis at a point between TM and trailing edge 26 to create a more elliptical shape. Due to spatial constraints or second fluid $F_2$ flow requirements, it may not be possible to increase the cross-sectional area of internal cavity 22 by expanding the overall cross-sectional area (i.e., defined by outer surface 32) of a respective core tube 20, rather, this can be achieved by reducing wall thickness Tw. Reduced wall thickness Tw can also increase heat transfer. As with the various roughened regions 34, 36, 38 described herein, variances in cross-sectional geometry and/or wall thickness can be selectively implemented at locations downstream of first fluid inlet side 12, and in all or just a subset of core tubes 20.

Core tubes 20 can be formed in a layer-by-layer fashion along the x, y, and z-axes using a suitable additive manufacturing process for metal (e.g., Inconel, aluminum, titanium, etc.) build materials, such as a laser powder bed fusion technique. Surface texture can be varied by varying additive manufacturing process parameters. For example, to create large and/or irregular surface roughness, both the scanning speed (measured in mm/s) and power (measure in W) of the laser can be increased relative to the settings used to form a relatively smooth surface. To create a more uniform (e.g., ribbed) surface roughness, scanning speed can be increased and laser power decreased compared to the smooth surface settings.

The disclosed heat exchanger core designs balance flow, pressure, and heat transfer considerations to optimize heat exchanger efficiency. Additionally, variable surface roughness can be used to limit metal temperatures in situations where temperatures could otherwise exceed material property capabilities. Such heat exchanger cores can be implemented in transportation (e.g., aerospace) and industrial applications.

Discussion of Possible Embodiments

The following are non-exclusive descriptions of possible embodiments of the present invention.

A heat exchanger core comprises a plurality of tubes extending along a first fluid axis, each of the plurality of tubes comprising a leading edge, a trailing edge opposite the leading edge, and a pair of oppositely disposed sidewalls extending from the leading edge to the trailing edge. The leading edge, trailing edge, and the pair of sidewalls define an inner surface and an outer surface of each of the plurality of tubes. Each of a first subset of the plurality of tubes further comprises a roughened region on the outer surface of one of the pair of sidewalls.

The core of the preceding paragraph can optionally include, additionally and/or alternatively, any one or more of the following features, configurations and/or additional components:

In the above core, each of the first subset of the plurality of tubes can include a roughened region on each sidewall of the pair of sidewalls.

Any of the above cores can further include a second fluid axis orthogonal to the first fluid axis.

In any of the above cores, the core can be configured to receive a first fluid along the first fluid axis from a first fluid inlet side to a first fluid outlet side, and the core can further be configured to receive a second fluid along the second fluid axis from a second fluid inlet side to a second fluid outlet side.

In any of the above cores, the first subset of the plurality of tubes can be positioned between a midpoint along the second fluid axis and the second fluid outlet side of the core.

In any of the above cores, each of a second subset of the plurality of tubes can include a roughened region on the internal surface.

In any of the above cores, the roughened region on the internal surface can be positioned between a midpoint along the first fluid axis and the first fluid outlet of the core.

In any of the above cores, each of a third subset of the plurality of tubes can include a first cross-sectional diameter near the first fluid inlet side and a second cross-sectional diameter near the first fluid outlet side.

In any of the above cores, the first cross-sectional diameter and the second cross-sectional diameter can be disposed orthogonally to the second fluid axis.

In any of the above cores, each of the pair of sidewalls can include a first wall thickness near the first fluid inlet side and a second wall thickness near the first fluid outlet side.

In any of the above cores, the second wall thickness can be less than the first wall thickness at a position overlapping with the second cross-sectional diameter.

In any of the above cores, each of a second subset of the plurality of tubes can include a roughened region on the outer surface at the leading edge.

In any of the above cores, the plurality of tubes can be formed from a metallic build material using an additive manufacturing process.

In any of the above cores, the roughened region can have an irregular pattern.

In any of the above cores, the roughened region can have a uniform pattern.

A method of forming a heat exchanger core comprises forming, in a layer-by-layer fashion, a plurality of core tubes along three orthogonal axes, the three orthogonal axes comprising a first axis, a second axis, and a third axis, engaging a first setting to form a relatively smooth region on a surface of one tube of the plurality of tubes, the first setting comprising a first laser scanning speed and a first laser power, and engaging a second setting to form a roughened region on the surface of the one tube of the plurality of tubes, the second setting comprising a second laser scanning speed and a second laser power. The first laser scanning speed is different from the second laser scanning speed, and the first laser power is different from the second laser power.

The method of the preceding paragraph can optionally include, additionally and/or alternatively, any one or more of the following features, configurations and/or additional components:

In the above method, the first laser scanning speed can be less than the second scanning speed, and the first laser power can be less than the second laser power.

In any of the above methods, the first laser scanning speed can be less than the second laser scanning speed, and the first laser power can be greater than the second laser power.

In any of the above methods, the plurality of core tubes can be formed from a metallic material.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A heat exchanger core comprising:
    a first fluid inlet side and a first fluid outlet side along which a first fluid is received along a first fluid axis, a midpoint being disposed along the first fluid axis between the first fluid inlet side and the first fluid outlet side;
    a second fluid inlet side and a second fluid outlet side along which a second fluid is received along a second fluid axis, a midpoint being disposed along the second fluid axis between the second fluid inlet side and the second fluid outlet side;
    a plurality of tubes extending along the first fluid axis between the first fluid inlet side and the first fluid outlet side;
    wherein each of the plurality of tubes comprises an airfoil shape having:
        a leading edge;
        a trailing edge opposite the leading edge; and
        a pair of oppositely disposed sidewalls extending from the leading edge to the trailing edge;
        wherein the leading edge, trailing edge, and the pair of sidewalls define an inner surface and an outer surface of each of the plurality of tubes; and
    wherein each tube of a first subset of the plurality of tubes further comprises a roughened region on the outer surface of one or both of the pair of sidewalls and/or the leading edge, the first subset being less than all tubes of the plurality of tubes.

2. The core of claim 1, wherein the first subset of the plurality of tubes is positioned between a midpoint along the second fluid axis and the second fluid inlet side of the core.

3. The core of claim 1 wherein each of a second subset of the plurality of tubes comprises a roughened region on the outer surface at the leading edge.

4. The core of claim 1, wherein the plurality of tubes are formed from a metallic build material using an additive manufacturing process.

5. The core of claim 1, wherein the roughened region has an irregular pattern.

6. The core of claim 1, wherein the roughened region has a uniform pattern.

7. The core of claim 1, wherein each of the first subset of the plurality of tubes comprises a roughened region on each sidewall of the pair of sidewalls, the roughened region separated from the trailing edge by a smooth region.

8. The core of claim 7, wherein the second fluid axis is orthogonal to the first fluid axis.

9. The core of claim 1, wherein each of a second subset of the plurality of tubes comprises a roughened region on the internal surface.

10. The core of claim 9, wherein the roughened region on the internal surface is positioned between the midpoint along the first fluid axis and the first fluid outlet side of the core, the roughed region extending to the first fluid outlet side of the core and separated from the first fluid inlet side by a smooth region.

11. The core of claim 1, wherein each of a third subset of the plurality of tubes comprises a first cross-sectional area near the first fluid inlet side and a second cross-sectional area the first fluid outlet side, wherein the second cross-sectional area is greater than the first cross-sectional area.

12. The core of claim 11, wherein the first cross-sectional area and the second cross-sectional area are disposed orthogonally to the second fluid axis.

13. The core of claim 11, wherein each of the pair of sidewalls comprises a first wall thickness near the first fluid inlet side and a second wall thickness near the first fluid outlet side; wherein the second wall thickness is less than the first wall thickness at a position overlapping with the second cross-sectional area.

14. A method of forming a heat exchanger core, the method comprising:
- forming, in a layer-by-layer fashion, a plurality of core tubes along three orthogonal axes; the three orthogonal axes comprising a first axis, a second axis, and a third axis, the plurality of core tubes extending along the first axis from a first fluid inlet side to a first fluid outlet side and spaced along the second axis between a second fluid inlet side and a second fluid outlet side, wherein each of the plurality of tubes comprises an airfoil shape having:
  - a leading edge;
  - a trailing edge opposite the leading edge; and
  - a pair of oppositely disposed sidewalls extending from the leading edge to the trailing edge;
  - wherein the leading edge, trailing edge, and the pair of sidewalls define an inner surface and an outer surface of each of the plurality of tubes;
- engaging a first setting to form a relatively smooth region on a surface of a first subset of the plurality of tubes, the first subset being less than all of the plurality of tubes and the first setting comprising a first laser scanning speed and a first laser power; and
- engaging a second setting to form a first roughened region on the outer surface of the first subset of the plurality of tubes, the second setting comprising a second laser scanning speed and a second laser power;
- wherein the first laser scanning speed is different from the second laser scanning speed;
- wherein the first laser power is different from the second laser power;
- wherein the first roughened region is disposed on one or both of the pair of sidewalls and/or on the leading edge.

15. The method of claim 14, wherein the first laser scanning speed is less than the second scanning speed, and wherein the first laser power is less than the second laser power.

16. The method of claim 14, wherein the first laser scanning speed is less than the second laser scanning speed, and wherein the first laser power is greater than the second laser power.

17. The method of claim 14, wherein the plurality of core tubes are formed from a metallic material.

18. The method of claim 14, and further comprising: engaging the first setting to form a relatively smooth region on the inner surface of a second subset of the plurality of tubes, and engaging the second setting to form a second roughened region on the inner surface of the second subset of the plurality of tubes; and wherein the second roughened region is positioned between a midpoint along the first axis and the first fluid outlet side and separated from the first fluid inlet side by the smooth region.

19. The method of claim 14, wherein the first subset of tubes is positioned between a midpoint along the second axis and the second fluid inlet side.

* * * * *